United States Patent
Siripunkaw et al.

(10) Patent No.: US 8,050,194 B2
(45) Date of Patent: *Nov. 1, 2011

(54) CUSTOMER PREMISE EQUIPMENT DEVICE-SPECIFIC ACCESS-LIMITING FOR A CABLE MODEM AND A CUSTOMER PREMISE EQUIPMENT DEVICE

(75) Inventors: Pak Siripunkaw, Sicklerville, NJ (US); Emery J Weber, Denver, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,750

(22) Filed: Dec. 21, 2010

(65) Prior Publication Data

US 2011/0093595 A1    Apr. 21, 2011

Related U.S. Application Data

(63) Continuation of application No. 11/603,761, filed on Nov. 22, 2006, now Pat. No. 7,881,225.

(60) Provisional application No. 60/739,472, filed on Nov. 23, 2005, provisional application No. 60/791,803, filed on Apr. 13, 2006.

(51) Int. Cl.
*H04L 12/28* (2006.01)

(52) U.S. Cl. .................................. 370/254; 709/224

(58) Field of Classification Search .................. 370/254, 370/352
See application file for complete search history.

(56) References Cited

U.S. PATENT DOCUMENTS

| | | | |
|---|---|---|---|
| 6,023,464 A | 2/2000 | Woundy | |
| 6,529,910 B1 | 3/2003 | Fleskes | |
| 6,553,568 B1 | 4/2003 | Fijolek et al. | |
| 6,570,855 B1 | 5/2003 | Kung et al. | |
| 6,574,796 B1 | 6/2003 | Roeck et al. | |
| 6,636,485 B1 | 10/2003 | Fijolek et al. | |
| 6,693,878 B1 | 2/2004 | Daruwalla et al. | |
| 7,127,049 B2 * | 10/2006 | Godse et al. | 379/93.28 |
| 7,272,846 B2 * | 9/2007 | Williams et al. | 725/111 |
| 7,496,652 B2 | 2/2009 | Pezzutti | |
| 7,512,969 B2 * | 3/2009 | Gould et al. | 726/4 |
| 7,836,092 B2 | 11/2010 | Alaniz et al. | |
| 2002/0010865 A1 | 1/2002 | Fulton et al. | |
| 2002/0013948 A1 | 1/2002 | Aguayo et al. | |
| 2002/0106017 A1 | 8/2002 | Dombkowski et al. | |
| 2002/0116721 A1 | 8/2002 | Dobes et al. | |

(Continued)

OTHER PUBLICATIONS

ISR issued in PCT/US08/081422, mail date Dec. 23, 2008.

(Continued)

*Primary Examiner* — Hassan Kizou
*Assistant Examiner* — Emmanuel Maglo
(74) *Attorney, Agent, or Firm* — Banner & Witcoff, Ltd.

(57) ABSTRACT

A method of initializing, provisioning, and managing a cable modem and a customer premise equipment device includes, prior to receiving the configuration file for the cable modem, providing an equipment identification message containing a description of the customer premise equipment device connected to the cable modem. In the case where the cable modem has yet to be provisioned, the configuration file received from the network server is a particular access-limiting configuration file that is selected from a group of access-limiting configuration files. The selection of the particular access-limiting configuration file is based on the description of the customer premise equipment device in the equipment identification message. This allows different devices to have different network restrictions or different walled gardens.

20 Claims, 2 Drawing Sheets

U.S. PATENT DOCUMENTS

| | | |
|---|---|---|
| 2003/0014764 A1 | 1/2003 | Saladino et al. |
| 2003/0069965 A1 | 4/2003 | Ma et al. |
| 2003/0106067 A1 | 6/2003 | Hoskins et al. |
| 2004/0190699 A1 | 9/2004 | Doherty et al. |
| 2004/0213278 A1 | 10/2004 | Pullen et al. |
| 2005/0034115 A1 | 2/2005 | Carter et al. |
| 2005/0060749 A1 | 3/2005 | Hong et al. |
| 2005/0078668 A1 | 4/2005 | Wittenberg et al. |
| 2005/0122976 A1 | 6/2005 | Poli et al. |
| 2005/0123001 A1 | 6/2005 | Craven et al. |
| 2005/0204168 A1 | 9/2005 | Johnston et al. |
| 2006/0173977 A1 | 8/2006 | Ho et al. |
| 2007/0016762 A1 | 1/2007 | Ho |
| 2007/0130471 A1 | 6/2007 | Walker Pina et al. |
| 2007/0133409 A1* | 6/2007 | McKinnon et al. ............ 370/230 |
| 2009/0238349 A1* | 9/2009 | Pezzutti ..................... 379/93.02 |

OTHER PUBLICATIONS

EP Search Report 08 84 6111, dated Feb. 7, 2011.

* cited by examiner

CUSTOMER PREMISE EQUIPMENT DEVICE-SPECIFIC ACCESS-LIMITING FOR A CABLE MODEM AND A CUSTOMER PREMISE EQUIPMENT DEVICE

RELATED APPLICATION

The present application is a Continuation of co-pending U.S. patent application Ser. No. 11/603,761, filed Nov. 22, 2006, entitled "Customer Premise Equipment Device-Specific Access-Limiting For A Cable Modem And A Customer Premise Equipment Device," which claims priority to U.S. Provisional Application No. 60/739,472, filed on Nov. 23, 2005, and U.S. Provisional Application No. 60/791,803, filed Apr. 13, 2006. Each of the above identified applications is hereby incorporated by reference in its entirety.

BACKGROUND OF THE INVENTION

1. Field of the Invention

The invention relates to a method of initializing, provisioning, and managing a cable modem and a customer premise equipment device. The invention further relates to cable modem configuration files, including the use of an access-limiting configuration file in a case where the cable modem has yet to be provisioned. The access-limiting configuration file restricts network access from the cable modem until the cable modem is provisioned.

2. Background Art

The modern hybrid fiber coax (HFC) network in its typical implementation includes fiber from the head end to the local network fiber node, and includes coax cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC network, head end infrastructure may include a cable modem termination system (CMTS) for providing data over cable services in addition to video quadrature amplitude modulation (QAM) infrastructure for providing video content. The video QAMs may connect to various content sources, while the CMTS connects subscribers to the provider network. The provider network may include a variety of infrastructure for providing various services. For example, the provider network may include Domain Name System (DNS) servers, dynamic host configuration protocol (DHCP) servers, voice over Internet protocol (VoIP) gateways and soft switches for connecting to phone networks, among other systems for providing services to subscribers. Further, advances in network technology allow some functionality to be provided from locations upstream or downstream of the traditional head end.

At a subscriber location, a cable modem and a customer premise equipment device such as a set-top box communicate with the head end over the HFC network. Traditionally, the cable modem utilizes known initializing and provisioning techniques to obtain a network address and establish a connection to the provider network. For example, the data-over-cable service interface specifications (DOCSIS) specify various protocols for managing the connection of a cable modem to a CMTS. In a traditional application, the cable modem can obtain an IP address in an known manner, and customer premise equipment connected to the HFC network through the cable modem may obtain an IP address, for example, by utilizing DHCP.

In an existing method of initializing a cable modem, the cable modem connection to the CMTS is initialized, the cable modem is provided with a network address, and the cable modem receives a cable modem configuration file from a network server. The configuration file contains service provisioning information. In order to configure services, the cable modem passes certain contents of the configuration file to the CMTS, and the CMTS passes certain identifiers back to the cable modem.

Typically, a service provider restricts or limits access to the network by a cable modem until the service provider validates the cable modem through a provisioning process. In one approach, the service provider maintains a list of hardware addresses for validated cable modems. When a cable modem attempts to initialize, if the hardware address is in the list of valid cable modem hardware addresses, the cable modem is allowed normal access to network resources. In the case where a cable modem has yet to be provisioned, a restricted environment may be provided for the cable modem.

One approach to providing this restricted environment, referred to as a walled garden, involves a single, special configuration file provided in all cases where the cable modem has yet to be provisioned. This special configuration file restricts network access from the cable modem. After the cable modem is provisioned, the cable modem would then receive a regular configuration file as opposed to the special configuration file that keeps the cable modem within the walled garden. Although existing methods of initializing cable modems can limit network access for cable modems that have not been validated, a more comprehensive approach is needed as additional products and services are added in a modern HFC network.

For the foregoing reasons, there is a need for a method of initializing, provisioning, and managing a cable modem and a customer premise equipment device in which, in a case where the cable modem has yet to be provisioned, there is greater flexibility in providing restricted access.

SUMMARY OF THE INVENTION

In accordance with the invention, a method of initializing, provisioning, and managing a cable modem and a customer premise equipment device is provided. The customer premise equipment device is connected to the cable modem. The cable modem is connected to a cable modem termination system (CMTS). The CMTS is connected to a provider network.

The method includes initializing the cable modem connection to the CMTS, providing the cable modem with a network address, and the cable modem receiving a cable modem configuration file from a network server. The configuration file contains service provisioning information. The cable modem passes certain contents of the configuration file to the CMTS, and the CMTS passes certain identifiers back to the cable modem. These initial steps for initializing and provisioning the cable modem may take place in any suitable way.

In a case where the cable modem has yet to be provisioned, the configuration file is in access-limiting configuration file. The access-limiting configuration file restricts network access from the cable modem until the cable modem is provisioned. In accordance with the invention, prior to receiving the configuration file, the cable modem provides an equipment identification message. The equipment identification message contains a description of the customer premise equipment device connected to the cable modem. For example, when the customer premise equipment device is a network addressable set-top box, the equipment identification message describes the customer premise equipment device as the network addressable set-top box.

In accordance with the invention, the configuration file received from the network server, in the case where the cable modem has yet to be provisioned, is a particular access-limiting configuration file that is selected from a group of access-limiting configuration files. The selection of the particular access-limiting configuration file from the group is based on the description of the customer premise equipment device in the equipment identification message.

According to the invention, different customer premise equipment devices have corresponding different access-limiting configuration files for use when provisioning has not yet occurred. For example, a subscriber gateway including an embedded set-top box and an embedded cable modem may receive a specific access-limiting configuration file when the cable modem has yet to be provisioned. On the other hand, some other customer premise equipment device may receive a different access-limiting configuration file when its cable modem has yet to be provisioned. In this way, different devices receive corresponding different restrictions to network resources when they are in the unprovisioned state. Put another way, different devices find themselves in different walled gardens.

It is appreciated that the equipment identification message may take any suitable form. As well, any suitable approach may be used to assure that the appropriate configuration file is received from the network server. For example, a trivial file transfer protocol (TFTP) server may serve the configuration files. Earlier in the initialization process, the cable modem is provided with the location of the server and appropriation configuration file to fetch. This appropriate configuration file is determined based on the equipment identification message provided by the cable modem during cable modem initialization.

At the more detailed level, the invention comprehends additional features. In one aspect, the access-limiting configuration file restricts access from the cable modem and directs any network content requests to a provisioning server. In various embodiments of the invention, various approaches may be taken to restrict network access, depending on the application. For example, when the network is an Internet protocol (IP) network including Domain Name System (DNS) servers, IP filtering and/or address resolution manipulation may be used to restrict access to the network, that is, to keep the device within its walled garden. For example, IP filtering may assure that only certain resources may be reached. For example, network address resolution manipulation may redirect all network content requests to the provisioning server.

DETAILED DESCRIPTION OF THE PREFERRED EMBODIMENT

Figure 1:
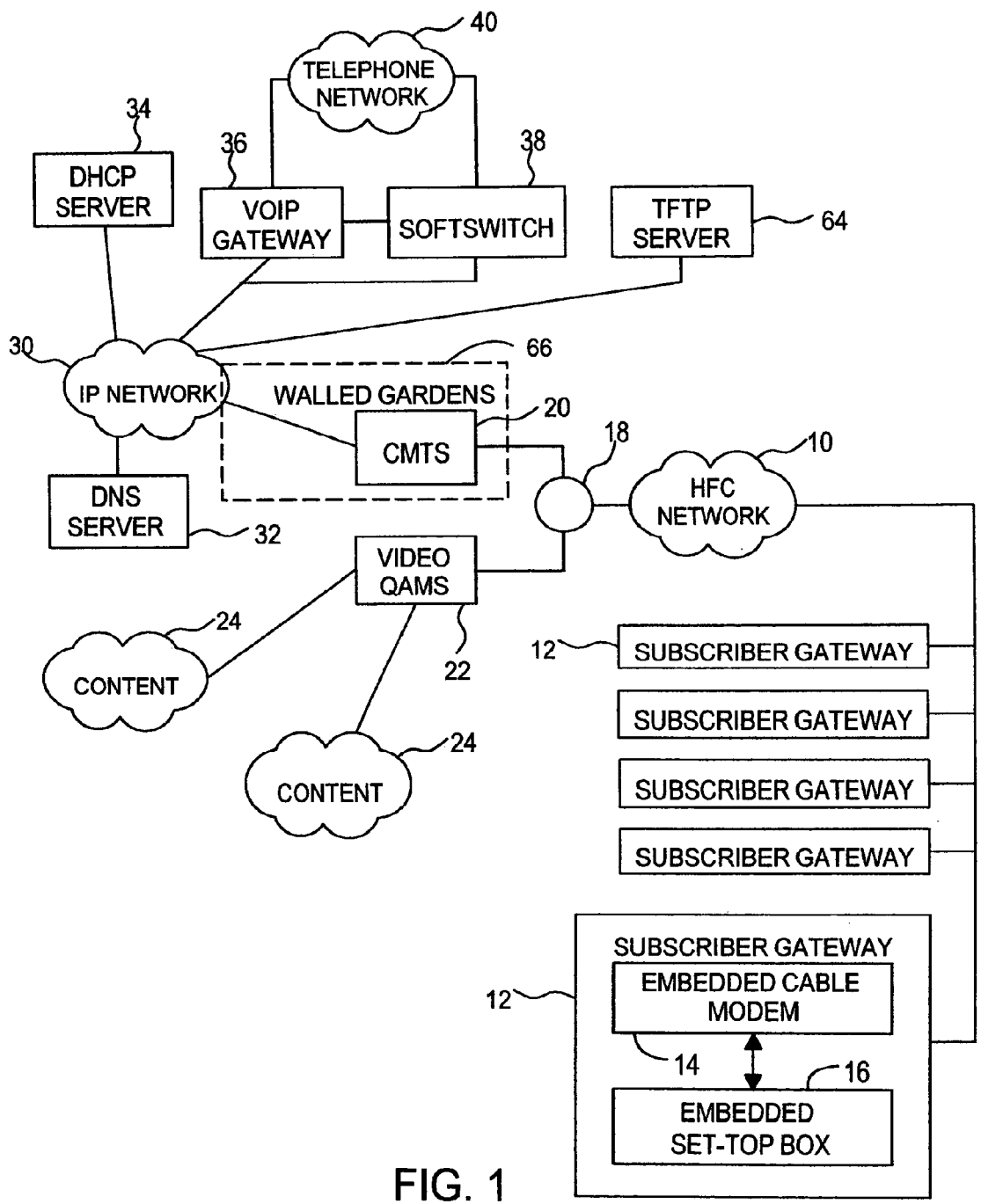
FIG. 1 illustrates a network diagram in accordance with a preferred embodiment of the invention.

In FIG. 1, the hybrid fiber coax (HFC) network 10 provides service to a plurality of subscribers. Each subscriber has a subscriber gateway 12. The subscriber gateway 12 is in the form of a next-generation set-top box and includes an embedded cable modem 14 and an embedded set-top box 16. The head end equipment includes cable modem termination system (CMTS) 20 and a plurality of video quadrature amplitude modulation (QAM) systems 22. Connector 18 illustrates the distribution of content from video QAMs 22 and data over cable from CMTS 20 over HFC network 10. In general, the HFC forward path spectrum includes a plurality of channels. Video QAMs 22 provide programming on the channels. Some channels are reserved for data over cable connections provided by CMTS 20. Video QAMs 22 receive content from any number of sources such as content sources 24.

It is appreciated that the architecture for the head end may vary. In FIG. 1, CMTS 20 connects to the provider Internet protocol (IP) network 30. Various services are provided to the subscribers; IP network 30 includes the appropriate infrastructure for the needed services. As shown, the network may include Domain Name System (DNS) server 32, dynamic host configuration protocol (DHCP) server 34, and voice over Internet protocol (VoIP) gateway 36 and soft switch 38 for connecting to a telephone network 40. The various servers may be located at the head end, or may be located at other locations connected to the provider network 30. Also, illustrated is trivial file transfer protocol (TFTP) server 64 which serves the configuration files.

Figure 2:
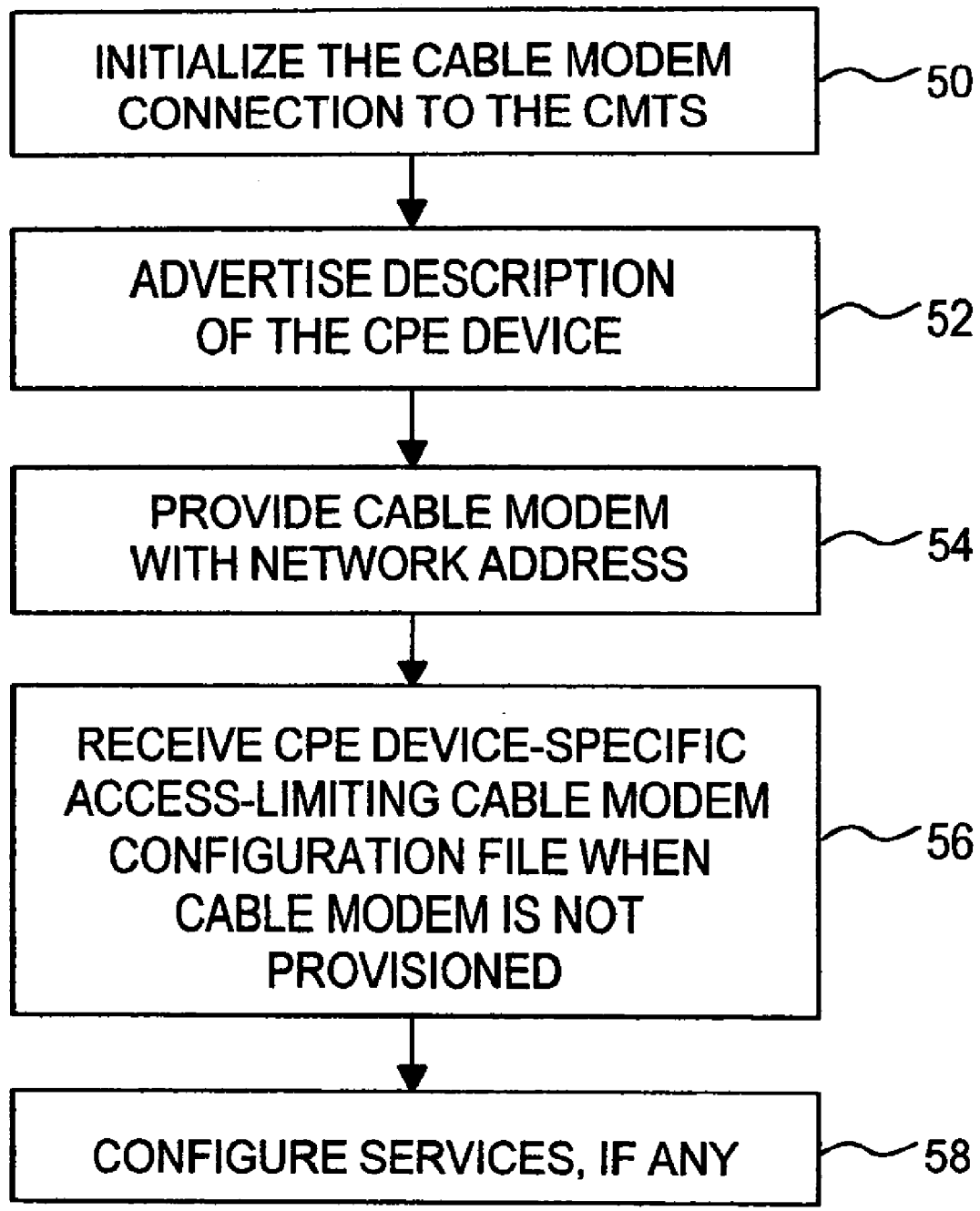
FIG. 2 illustrates initializing, provisioning, and managing a cable modem and a customer premise equipment device in the preferred embodiment of the invention.

With reference to FIGS. 1 and 2, a preferred embodiment of initializing, provisioning, and managing a cable modem and a customer premise equipment device is illustrated. The customer premise equipment device is depicted as an embedded set-top box 16, but may take other forms.

At block 50, the cable modem connection to the CMTS 20 is initialized. At block 52, the cable modem 14 advertises the description of the customer premise equipment device 16. This is the providing of the equipment identification message in the preferred embodiment. At block 54, the cable modem 14 is provided with a network address. In more detail, the cable modem 14 is initialized and provisioned using a suitable technique such as known DOCSIS techniques. At block 56, the cable modem 14 receives the cable modem configuration file, for example, from trivial file transfer protocol (TFTP) server 64. Specifically, in the case where the cable modem 14 has yet to be provisioned, a particular access-limiting configuration file that is selected from a group of access-limiting configuration files is received. The selection of the particular access-limiting configuration file from the group is based on the description of the customer premise equipment 16 in the equipment identification message. In this way, different devices may have different restrictions. Put another way, different devices have different walled gardens 66.

For example, one possible implementation is that each kind of CPE device has its own particular access-limiting configuration file that is used when the CPE device's cable modem is not yet provisioned to provide its own particular walled garden. In a straight forward implementation, each device's walled garden 66 contains only network resources related to device provisioning (possibly including self-provisioning). Further, in this example, a set-top box would be in a walled garden designed specifically for set-top boxes, while some other device would be in a walled garden designed specifically for that device. For example, a walled garden for STBs could contain access to certain video servers while some other device has a walled garden that does not include such access. Embodiments of the invention are about device-specific walled gardens implemented via device specific configuration files that are selected based on an equipment identification message that advertises a description of a connected CPE device.

After the cable modem 14 receives the cable modem configuration file, services are configured. In the case where the cable modem 14 has yet to be provisioned, services, if any, are configured at block 58. At this point, the cable modem 14 has completed initialization, and is a manageable network element in the operator's IP network.

Generally, the initializing and provisioning may take place according to DOCSIS standards or any other suitable approach involving a downloaded configuration file; however, in accordance with the invention, the configuration file sent to the cable modem includes service provisioning information and further, in the case where the cable modem has yet to be provisioned, the configuration file is a particular access-limiting configuration file that is selected from a group of access-limiting configuration files. Put another way, different devices have different walled gardens or different network restrictions. This approach has many advantages. The equipment identification message may be provided in any appropriate way such that the cable modem can be notified of the appropriate configuration file to download from the network server. For example, the cable modem may advertise the description of the CPE device, that is, provide an equipment identification message, during a suitable dynamic configuration technique. A dynamic configuration response may include the name and location of the needed access-limiting configuration file.

It is appreciated that embodiments of the invention may involve any suitable underlying initializing and provisioning technique with different devices being provided with different access-limiting configuration files, that is, different devices having different walled gardens. Further, the cable modem and CMTS may take a variety of forms and the type of cable plant is not limited to coax cable or HFC arrangements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. One or more non-transitory computer-readable media storing computer-readable instructions that, when executed by at least one computer, cause computer to perform the following:
   receiving a request for access from an unprovisioned access device; and
   prior to provisioning the access device, partially provisioning the access device to grant different levels of temporary access to a provisioning system for different types of customer premise equipment serviced by the access device, wherein
      a first level of temporary access allows a first type of customer premise equipment to use the access device to temporarily access a resource offered by the provisioning system while the access device is awaiting provisioning, and
      a second level of temporary access does not allow a second type of customer premise equipment to use the access device to access that resource offered by the provisioning system while the access device is awaiting provisioning.

2. The one or more non-transitory computer-readable media of claim 1, further storing computer-readable instructions that, when executed by the at least one computer, further cause the computer to perform the following:
   prior to provisioning the access device, transmitting to the access device a location of a configuration file, wherein the configuration file is downloadable by the access device and partially provisions the access device to grant different levels of temporary access to the provisioning system for different types of customer premise equipment serviced by the access device.

3. The one or more non-transitory computer-readable media of claim 1, further storing computer-readable instructions that, when executed by the at least one computer, further cause the computer to perform the following:
   downloading to a plurality of different unprovisioned access devices, different configuration files, granting different levels of temporary access to the provisioning system, based on types of customer premise equipment identified to the provisioning system by the different unprovisioned access devices.

4. The one or more non-transitory computer-readable media of claim 1, further storing computer-readable instructions that, when executed by the at least one computer, further cause the computer to perform the following:
   downloading different configuration files to implement different device-specific walled gardens for different customer premise equipment devices serviced by access devices in an unprovisioned state.

5. The one or more non-transitory computer-readable media of claim 1, further storing computer-readable instructions that, when executed by the at least one computer, further cause the computer to perform the following:
   directing requests from the second type of customer premise equipment to use the access device to access the resource offered by the provisioning system while the access device is awaiting provisioning to a provisioning server.

6. A server comprising:
   a processor; and
   memory storing computer-executable instructions that, when executed by the processor, cause the server to perform a method including:
      receiving a request for access from an unprovisioned access device; and
      prior to the server provisioning the access device, the server partially provisioning the access device to grant different levels of temporary access to the server for different types of customer premise equipment serviced by the access device, wherein
         a first level of temporary access allows a first type of customer premise equipment to use the access device to temporarily access a resource offered by the server while the access device is awaiting provisioning, and
         a second level of temporary access does not allow a second type of customer premise equipment to use the access device to access that resource offered by the server while the access device is awaiting provisioning.

7. The server of claim 6, wherein the computer-executable instructions, when executed by the processor, further cause the server to perform the method including:
   prior to provisioning the access device, transmitting to the access device a location of a configuration file, wherein the configuration file is downloadable by the access device and partially provisions the access device to grant different levels of temporary access to the server for different types of customer premise equipment serviced by the access device.

8. The server of claim 6, wherein the computer-executable instructions, when executed by the processor, further cause the server to perform the method including:
downloading to a plurality of different unprovisioned access devices, different configuration files, granting different levels of temporary access to the server, based on types of customer premise equipment identified to the server by the different unprovisioned access devices.

9. The server of claim 6, wherein the computer-executable instructions, when executed by the processor, further cause the server to perform the method including:
downloading to access devices in an unprovisioned state, different configuration files to implement different device-specific walled gardens for different customer premise equipment devices serviced by the access devices in the unprovisioned state.

10. The server of claim 6, wherein the computer-executable instructions, when executed by the processor, further cause the server to perform the method including:
directing requests from the second type of customer premise equipment to use the access device to access the resource offered by the server while the access device is awaiting provisioning to a provisioning server.

11. A gateway device, the gateway device comprising:
an access device configured to perform the following:
upon connection of the access device to a provisioning system, and prior to provisioning of the access device, the access device providing one or more equipment identification messages to the provisioning system, the one or more messages identifying a plurality of consumer premise equipment to be serviced by the access device; and the access device receiving one or more access device configuration files from the provisioning system; and
the access device using the one or more configuration files to provide different levels of pre-provisioning network access to the plurality of consumer premise equipment based on device type while awaiting provisioning from the provisioning system.

12. The gateway device of claim 11, further configured to restrict access from the access device and direct network content requests from a set-top box to a provisioning server, based on the received configuration file and while the access device is in an unprovisioned state.

13. The gateway device of claim 11, wherein the access device is configured, by the configuration file, to restrict pre-provisioning network access of the consumer premise equipment using network address filtering while the access device is in an unprovisioned state.

14. The gateway device of claim 11, wherein the access device is configured, by the configuration file, to restrict pre-provisioning access of the consumer premise equipment using network address resolution manipulation while the access device is in an unprovisioned state.

15. The gateway device of claim 11 wherein the provider network is an Internet Protocol network.

16. A method of controlling network access, comprising:
receiving, by a provisioning system, a request for access provisioning from an unprovisioned access device on a network managed by the provisioning system;
identifying, by the provisioning system, a plurality of different pieces of consumer premise equipment to be serviced by the access device; and
granting, by the provisioning system and to the access device, different levels of pre-provisioning access to the network for the plurality of different pieces of consumer premise equipment to be serviced by the access device.

17. The method of claim 16, wherein the different levels correspond to different types of consumer premise equipment based on a type of data they consume.

18. The method of claim 17, wherein a first type of consumer premise equipment is a video access device type.

19. The method of claim 18, wherein the level of pre-provisioning network access for the video access device type of consumer premise equipment includes video server access, while the level of pre-provisioning network access for a non-video-access-device type of consumer premise equipment does not include video server access.

20. The method of claim 19, wherein the video access device type is a set-top-box.

* * * * *